United States Patent
Lynch et al.

(10) Patent No.: US 7,035,229 B1
(45) Date of Patent: Apr. 25, 2006

(54) METHOD AND APPARATUS FOR DYNAMIC ALLOCATION OF CONFERENCING RESOURCES IN A TELECOMMUNICATIONS SYSTEM

(75) Inventors: John T. Lynch, East Sandwich, MA (US); Robert H. Squires, East Falmouth, MA (US); Franz Weller, Harwich, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/544,735

(22) Filed: Apr. 7, 2000

(51) Int. Cl.
  *H04L 12/16* (2006.01)
  *H04L 12/66* (2006.01)
  *H04M 1/00* (2006.01)
  *G06F 15/16* (2006.01)

(52) U.S. Cl. .................. 370/260; 370/356; 370/400; 379/158; 709/229

(58) Field of Classification Search ............... 370/260, 370/261–266, 437, 432, 348, 442, 400, 352–356, 370/424; 379/202.01, 157, 158; 709/227, 709/229
See application file for complete search history.

(56) References Cited

U.S. PATENT DOCUMENTS

| | | | |
|---|---|---|---|
| 5,349,579 A | | 9/1994 | Madonna et al. |
| 5,544,163 A | | 8/1996 | Madonna |
| 5,758,079 A | * | 5/1998 | Ludwig et al. ............. 709/204 |
| 5,920,546 A | * | 7/1999 | Hebert et al. ................ 370/260 |
| 5,995,491 A | * | 11/1999 | Richter et al. .............. 370/263 |
| 5,995,608 A | * | 11/1999 | Detampel et al. ...... 379/205.01 |
| 6,006,269 A | * | 12/1999 | Phaal ........................... 709/227 |
| 6,055,564 A | * | 4/2000 | Phaal ........................... 709/207 |
| 6,226,287 B1 | * | 5/2001 | Brady ......................... 370/352 |
| 6,226,288 B1 | * | 5/2001 | Allen ........................... 370/376 |
| 6,324,169 B1 | * | 11/2001 | Roy ............................. 370/260 |
| 6,389,024 B1 | * | 5/2002 | Ghai et al. .............. 370/395.31 |
| 6,411,601 B1 | * | 6/2002 | Shaffer et al. .............. 370/230 |
| 6,463,056 B1 | * | 10/2002 | Silva et al. ................. 370/356 |
| 6,526,050 B1 | * | 2/2003 | Hebert et al. ............... 370/389 |
| 6,603,757 B1 | * | 8/2003 | Locascio ..................... 370/352 |
| 6,662,211 B1 | * | 12/2003 | Weller ......................... 709/204 |

* cited by examiner

*Primary Examiner*—Seema S. Rao
*Assistant Examiner*—Melanie Jagannathan (57) ABSTRACT

A method and apparatus for dynamic allocation of conferencing resources in a telecommunications system is provided. The method and apparatus provide for dynamic allocation of conferencing resources in two forms, first a predefined order of allocation of time slots for use in conferencing is described. This predefined order of allocation minimizes the risk that a conference will be interrupted if additional line cards are added to the system while the conference is in progress. The second form of dynamic allocation of resources involves locating and selecting the digital signal processing (DSP) resources to perform the conferencing function. For this allocation, the conference type is first identified. The conference will be determined to be a static, dynamic or critical conference by the CPU/Matrix card. Based upon this determination, the DSP circuit with the appropriate resources for that conference type is selected. For example, if the conference is determined to be dynamic, i.e., it is likely to change in size, then a DSP with additional available channels will preferably be selected. If a conference is critical, then the same type of DSP is selected, but further conferences are blocked from being added to that DSP. A static conference will be allocated to a DSP on a best-fit basis.

15 Claims, 7 Drawing Sheets

| CHANNELS | IDENTIFYING DESCRIPTION | ORDER OF ALLOCATION |
|---|---|---|
| 0 - 191 | REGULAR T1 CHANNELS | 5 |
| 192 - 215 | LOWER LARGE DEAD ZONE (24 CHANNELS) | 2* |
| 216 - 223 | LOWER SMALL DEAD ZONE (8 CHANNELS) | 1* |
| 224 - 247 | UPPER SMALL DEAD ZONE (24 CHANNELS) | 2* |
| 248 - 255 | UPPER SMALL DEAD ZONE (8 CHANNELS) | 1* |

* IF LSD OCCUPIED WITH T1 CARDS

METHOD AND APPARATUS FOR DYNAMIC ALLOCATION OF CONFERENCING RESOURCES IN A TELECOMMUNICATIONS SYSTEM

BACKGROUND OF THE INVENTION

1. Field of the Invention

The present invention relates generally to the field of telecommunications and, more specifically to a method and apparatus for providing dynamic allocation of conferencing resources in an expandable telecommunications switching system.

2. Background Information

A competitive telecommunication system must be capable of providing a wide variety of telecommunications services. For example, subscribers may request services such as voice processing services, call waiting, caller identification and call forwarding. In the commercial context, one of the most desirable services is that of conferencing. Conferencing refers to the ability of three or more callers each using a separate telephone set and often located at remote locations from each other, to participate in a single telephone call simultaneously. In addition, there is an ever-expanding need for conferencing services, which can accommodate reasonably large conferences of, for example, about 30 participants. In addition, there is a need for a conferencing service, which can adapt dynamically to a change in the conference size while the conference is in progress.

In addition, the advantage of an expandable telecommunication system is that additional capacity for handling a greater amount of telecommunications, or additional components, which can provide new services, may be added to the system while the system is in operation. This is often referred to as "hot-plugging" components. At times, if the configuration of a telecommunication system is changed, this can affect the communications that are then in progress. This is because the timing and control in a high-speed telecommunications system is critical and any change in the system could result in dropped time slots of voice information or, ultimately, to dropped calls. This is also true of conferencing. The input signals of voice information from the conferees or the conferenced output could be affected should a change in the system configuration be made. Thus, there is a need for a system which provides conferencing services that will support a conference in progress and minimizes the risk that an entire conference is dropped or participants in the conference are purged even when components are hot-plugged into the system.

Originally, conferencing systems had interfaced with a conventional computer-controlled digital switching matrix within a Private Branch Exchange (PBX) switch or a public switching system that provided a circuit switching function. More recently, it has been known to provide conferencing in a high-speed digital communications network that includes a plurality of switching nodes with each node including its own nodal switch. This type of system is described in commonly-owned U.S. Pat. No. 5,920,546 (Hebert et al.) for a METHOD AND APPARATUS FOR CONFERENCING IN AN EXPANDABLE TELECOMMUNICATIONS SYSTEM, which is presently incorporated herein by reference in its entirety.

In accordance with that system, at least one node in the system (e.g., a conferencing node) contains a digital signal processing ("DSP") circuit capable of performing a conferencing operation on the voice information of the conferees. More specifically, the DSP circuitry executes a conferencing function on the voice information by operating on it using, for example, a conferencing algorithm that often includes summing together the channels of voice information from each conferee. As is typical in the industry, after summing all of the voice data, the conference processor typically subtracts each conferee's data from the summed total intended for that conferee. This is done in order to minimize echo effects and improve system stability. The DSP circuit executes this conferencing function on the voice information and then outputs a different instance of conferenced voice information for each conferee. Each instance of conferenced voice information is then transmitted to the corresponding conferee. Sometimes, this may occur within a single node. In other cases, the conferencing node may be a remote node, which is located elsewhere in the network, and is not interfaced with any one of the conferees.

When conferencing resources in a DSP are located, the voice information from each node interfaced with a conferee is addressed and transmitted to the conferencing node, over the inter-nodal network. The DSP circuitry in the conferencing node performs the conferencing algorithm and then places the instances of conferenced voice information on an internal bus located in the conferencing node. A data transmitter in the nodal switch that is preferably linked with the bus then receives the instances of conferenced voice information. Next, the conferencing node may formulate a packet or packets containing the instances of conferenced voice information for transmission via its data transmitter over the network. Specifically, each instance of conferenced voice data may be packetized, addressed and transmitted via a time slot (or channel) assigned to the conference according to instructions from the system. The time slots of conference voice data are transmitted to the programmable switching node interfaced with the corresponding conference participants. Each programmable switching node, upon receipt of the packet or packets then captures the instance of conferenced voice information ear marked for that participant via its own data receiver and switches the information to the participant. Further details of the routing of this information may be found in the '546 patent.

Despite its utility in forming a conference that has a high quality voice signal output, the conferencing technique described in the '546 patent does not fully allow for the further capacity to accommodate conferences that may dynamically grow or shrink. In addition, there is a further need for a conferencing system that is adaptable for handling conferences in progress even when certain components (such as a T-1 line card) are added into the system while the system is in operation. This need is particularly great with larger conferences of about 20–30 participants.

SUMMARY OF THE INVENTION

It is therefore an object of the present invention to provide a method and apparatus for dynamic allocation of conferencing resources which will provide a conference of a large number of participants, (e.g., 20–30) that supports a conference which may change in size while the conference is in progress. It is a further object of the present invention to provide a conferencing system that is compatible with a high speed, expandable telecommunications system and which will most likely maintain a conference in progress even when other components are added to the system in operation.

Briefly, the invention comprises a method and apparatus for dynamic allocation of conferencing resources in an expandable telecommunications system. A preferred embodiment of the invention operates within a high-speed telecommunication system comprised of multiple switching nodes connected by an inter-nodal network. At least one node in the system contains a digital signal processing (DSP) card which contains conferencing resources which are capable of performing conferencing functions on the voice information from conferees connected to the system. Typically, many nodes will contain multiple DSP integrated circuits (chips) in a DSP module on a DSP card. A DSP chip contains a microprocessor as well as memory storage devices. The DSP circuit performs a conferencing algorithm on the voice information and outputs this to the conferees. The DSP circuit can handle several conferences at a time, or may handle one large conference.

When a conference is being established, the CPU/Matrix card or the nodal switch issues a resource-locate message. Two different types of conferencing resources need to be allocated. First, available conferencing resources for performing the conferencing function within a DSP circuit in a node in the system must be identified. In addition, the node which is to be the conferencing node must not only have sufficient conferencing resources in its DSP card, but it also must have sufficient available time slots on its switching buses to manage the data to and from all of the conferees. Once a conference node is located, the voice information at each node interfaced with the conferee is addressed and transmitted to the conferencing node. In addition, the CPU/Matrix card assigns the time slots to be used by the DSP circuit when it receives input signals from the conferees and for use when it generates and transmits the outputs of instances of conferenced information.

The two types of resources for conferencing are allocated in accordance with the two different aspects of the invention. First, the CPU/Matrix card reviews the DSP resources available at that instant in time in the system. More specifically, if a conference is likely to grow, then the CPU/Matrix card locates and selects the DSP chip having the greatest amount of available channels so that the conference can grow as large as possible. Further, if a conference has been identified as a critical conference (based upon, for example, its likelihood to grow, or based upon a user-defined estimation of its importance), then the system selects a DSP chip that is currently handling no other conferences so that all of its channels are available. If no such DSP chip can be found, then the system selects a DSP chip that has the greatest amount of available channels. When a critical conference exists on a DSP chip, the CPU/Matrix card prohibits any additional conferences from being created on that chip. This prohibition maximizes the number of channels available for the critical conference to grow in size, subject to the condition that other conferences that may preexist on that DSP chip may not be disrupted or impeded from growing in size. For a static conference, the DSP is allocated on a "best fit" basis, meaning that the system will attempt to fit as many conferences as possible on a single DSP chip before assigning conferences to another DSP chip. Thus, in accordance with the invention, a hierarchy is established for assigning conferences to the DSP chip on the DSP cards in the system.

Secondly, in accordance with the invention, the CPU/Matrix card assigns time slots on the internal buses, which carry information between the line cards and the nodal switch in a node. These time slots are assigned in such a manner that the risk is minimized that a conference may be interrupted when a new line card is added to the chassis while the system is in operation.

Although the invention is described herein with regard to a preferred embodiment of an expandable telecommunications system, it should be understood that the invention may be adapted for use with other types of expandable telecommunications systems.

BRIEF DESCRIPTION OF THE DRAWINGS

The invention is pointed out with particularity in the appended claims. The above and further advantages of the invention may be better understood by referring to the following description in conjunction with the accompanying drawings in which:

DETAILED DESCRIPTION OF AN ILLUSTRATIVE EMBODIMENT

Figure 1:
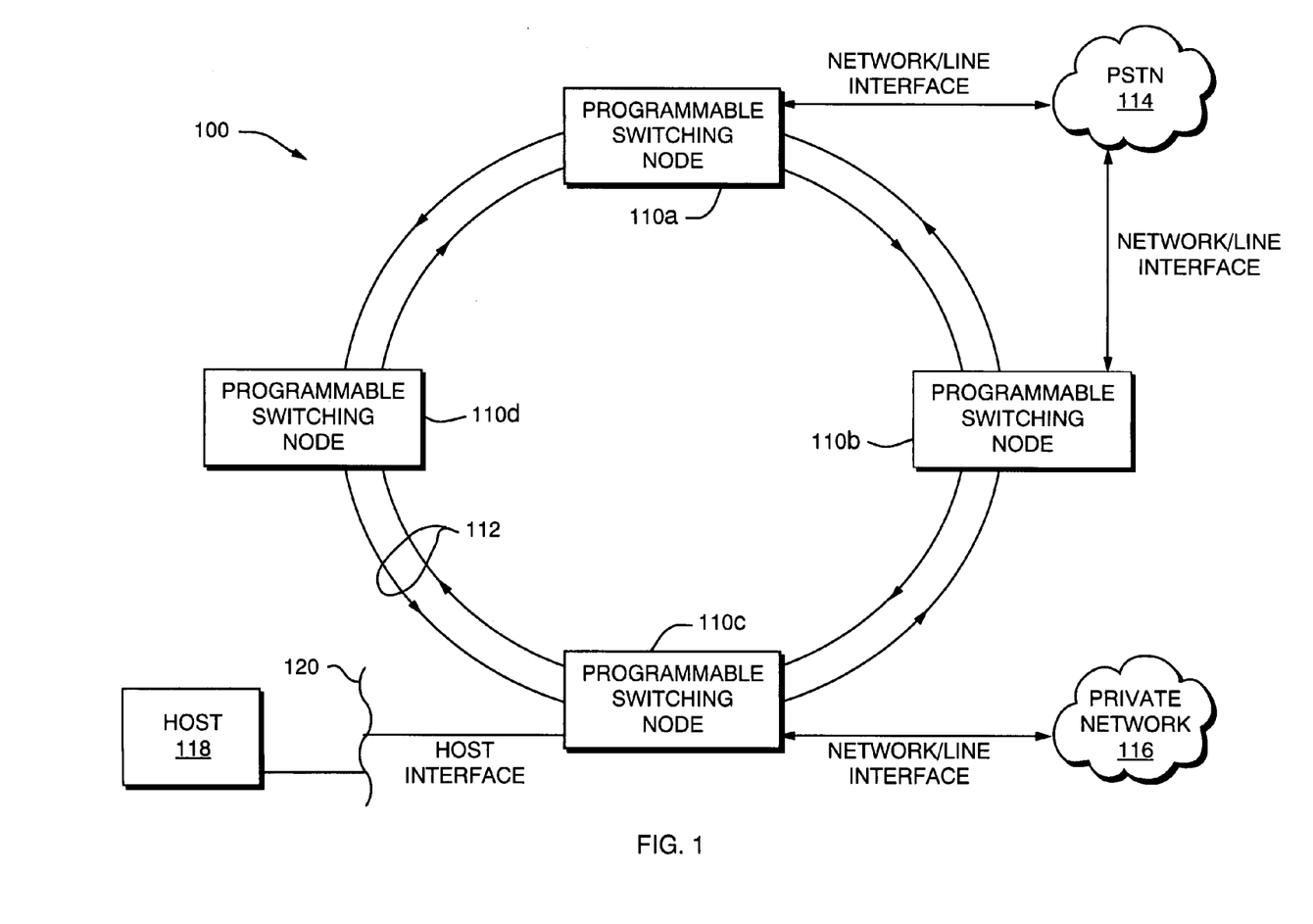
FIG. 1 is a highly schematic block diagram of an expandable telecommunication system employing a ring type inter-nodal network.

FIG. 1 shows a large capacity, expandable, fully programmable telecommunications switching system 100. Details of the construction and operation of system 100 may be found in U.S. Pat. Nos. 5,544,163 and 5,349,579, both of which are assigned to the assignee of the present invention. To aid in the understanding of the present invention, certain aspects of the system 100 are discussed here.

The system 100 includes a series of programmable switching nodes 110a–110d connected together by an inter-nodal network 112. The network 112 preferably supports high-speed, high-bandwidth digital communications between the nodes 110a–110d. The inter-nodal network 112 may be a ring-type network implemented using two rings, as shown in FIG. 1. The network 112 may also be implemented with any of a variety of other types of communication networks including Ethernet or other types of LANs, wireless communication networks, the PSTN (ATM/sonet), or the Internet.

As shown in FIG. 1, nodes 110a and 110b each include a digital network/line interface for connection with PSTN 114. Node 110c also includes a digital network/line interface and is connected to a private network 116. The term "private network" is intended in a broad sense to refer to any network or line or other interface other than the PSTN. The network/line interfaces of nodes 110a–110c terminate either digital networks or analog trunks/lines, or combinations of both types. It should be further understood that the network/line interfaces of any given node may include suitable interfaces for performing communications using ATM, signaling system 7 (SS7), ISDN T1/robbed bit, E1/CAS or other communication protocols. It should be further understood that one or more nodes may not include network/line interfaces. Such nodes may instead provide voice processing resources.

The overall operation of the system 100 is preferably controlled by a host 118, which may be implemented with a personal computer (PC) workstation, fault tolerant or other computer on which a user's application software runs. As shown, note 110c includes a host interface which is connected in communicating relationship by a local area network (LAN) 120 with the host 118. The host 118 and node 110c are thus able to exchange messages. The interconnection between the host 118 and the node 110c may be provided by Ethernet, asynchronous communication (RS/232) links or other communication links.

The host 118 also communicates with the other nodes 110a, 110b and 110d of the system 100 over the inter-nodal network 112. More specifically, the host 118 communicates with any node by passing messages first in node 110c which, in turn, places the message on the inter-nodal network 112 for delivery to the appropriate nodes. Further details of the operation of this aspect of the system may be found in the '579 patent which has been incorporated herein.

As described in more detail below, the host 118 may also establish conferences among three or more conferees who have access to the system 100.

Figure 2:
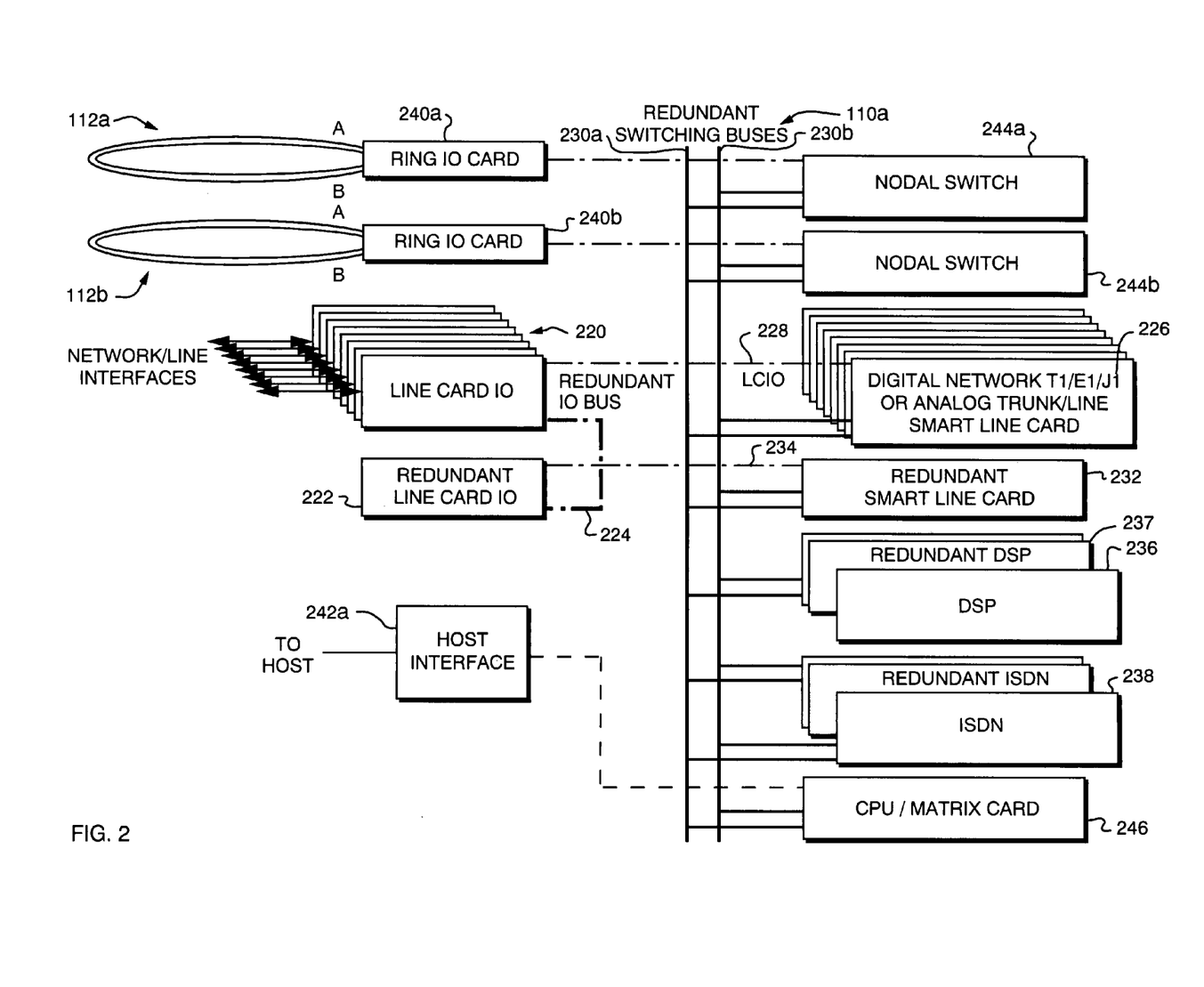
FIG. 2 is highly schematic block diagram of a programmable switching node that may be used in the system of FIG. 1.

FIG. 2 shows the major functional components of a preferred embodiment of one type of programmable switching node 110a, which may be used in the system of FIG. 1. Digital or analog network/line interfaces are terminated on a series of line card input/output (IO) cards 220. In a preferred embodiment of the invention, network/line interfaces representing a total of 2,048 ports may be terminated by line card IO cards 220. If desired, a redundant line card IO card 222 and redundant IO bus 224 may optionally be provided to permit continued operation of the switching node 110a in the event of a failure of one of the line card IO cards 220.

A series of digital network T1, E1, J1 or analog trunk/line line cards 226 communicate with the line card IO cards 220 over line card (LC) IO lines 228. Line cards 226 are also interfaced with redundant switching buses 230a and 230b. Again, if desired, an optional redundant line card 232 may be provided which communicates with redundant line IO card 222 over redundant line card IO lines 34. Other types of network/line interfaces such as DS3, SONET or others may also be provided.

The method of the present invention is preferably performed on DSP card 236, which may be paired with a redundant DSP card 237, if desired in the application. Other communication services such as tone detection, tone generation, voice recorded announcements, call progress analysis, speech recognition, ADPCM compression and many others can be provided as will be understood by those skilled in the art.

ISDN primary rate services and other packet communication services can be provided by ISDN card 238 and its redundant paired card.

An inter-nodal network IO card 240a serves an interface between the inter-nodal network 112 and a nodal switch 244a. A second inter-nodal network IO card 240b serves as an interface between an optional, second inter-nodal network 112b and an optional, second nodal switch 244b which preferably is in the same construction as the nodal switch 244a.

A CPU/matrix card 246 is interfaced with switching buses 230a and 230b and with the host interface 242a. The CPU/matrix card 246 is the primary control element for the overall switching node 110a and it includes the switching matrix whereby channels which may come into the node through the line card IO cards 220 or from inter-nodal networks 112a or 112b, as well as instructions from the host, can be processed in that node 110a.

In the high speed, digital communications network of the preferred embodiment, each node 110a through 110d includes a nodal switch having circuitry for formulating transmitting and receiving variable—length, packetized information (e.g., voice, data, video, multimedia, control, configuration, maintenance, etc.) over the network. This enables each node to receive information from or transmit information to all other nodes. In order to do this, the cards in each time slot are assigned particular time slots in which to transmit information. All of the nodes receive and listen to all time slots, but each node only transmits during its assigned time slot. The nodal switch has the requisite circuitry to receive, over internal buses, time division multiplexed (TDM) data transmitted in all time slots from all line cards. In addition, each switching bus preferably includes a high level data link control bus over which CPUs in the nodal and in the line cards may exchange control messages. Thus, the nodal switch is preferably able to control the flow of information over the switching buses.

Figure 3:
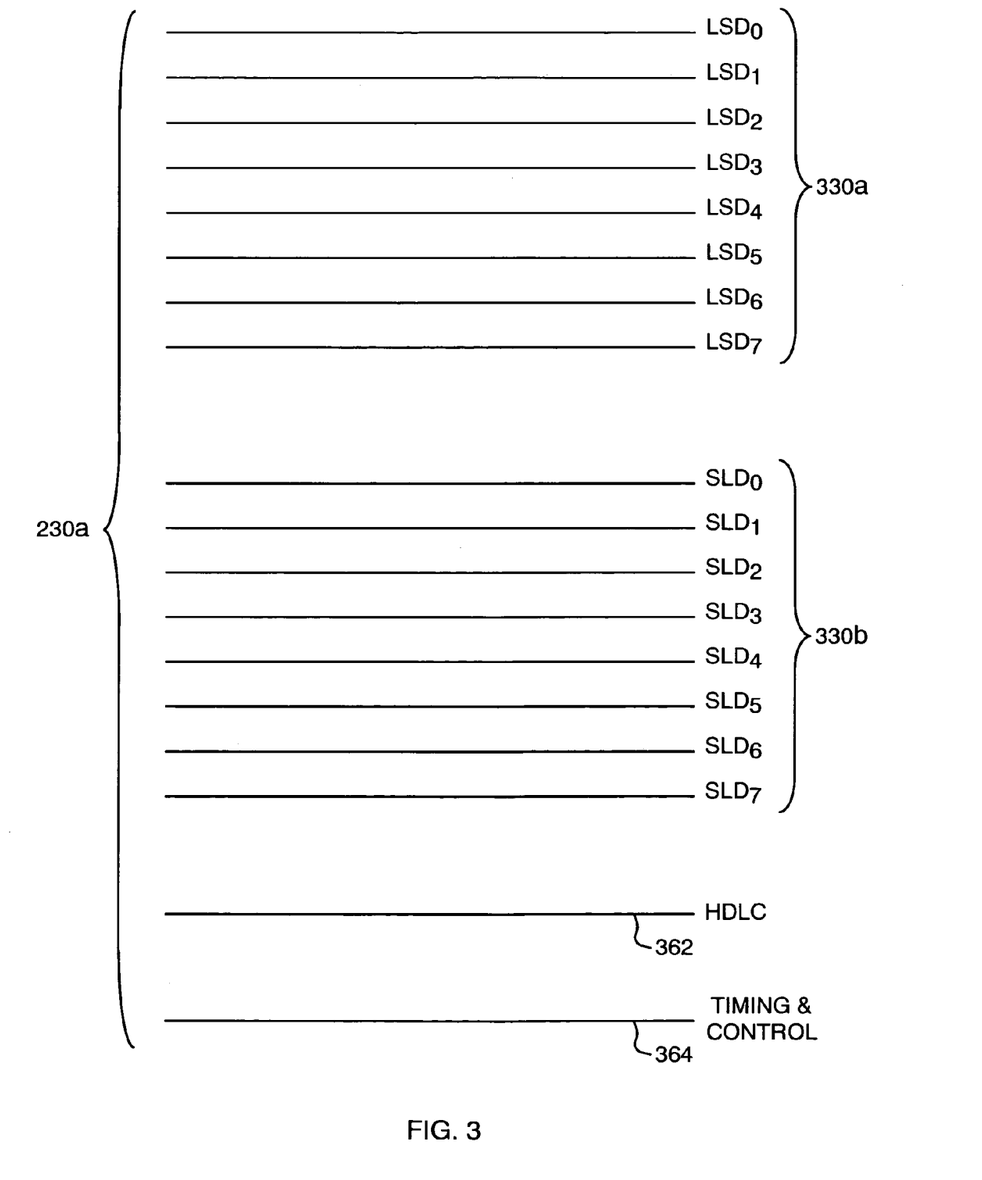
FIG. 3 is a highly schematic diagram of the midplane bus structure of the expandable telecommunications system of FIG. 1.

More specifically, the nodal switch 244a and the other cards communicate with one another, and with the CPU/Matrix card, along the redundant switching buses 230a and 230b shown schematically in FIG. 2. The buses 230a and 230b are physically located along the midplane of the chassis that houses the cards. The switching bus 230a, for example, is physically comprised of multiple individual buses. These individual buses are shown in greater detail in FIG. 3. FIG. 3 illustrates the primary switching bus 230a. It should be understood that the components comprising primary switching bus 230a are exactly replicated in redundant switching bus 230b, but for purposes of clarity of illustration, the redundant set is not shown in FIG. 3.

Referring now to FIG. 3, primary switching bus 230a includes the line-to-switch data ("LSD") bus 330a which is comprised of multiple individual bus conductor $LSD_0$ through $LSD_7$. Each individual LSD bus conductor carries time slots coming into the node from the line cards, such as a T1 line card. The T-1 line card is physically connected via its edge connectors to the conductors of the LSD bus 330a. Each one of the conductors $LSD_0$ through $LSD_7$, has a capacity of carrying 256 time slots of PCM-encoded voice information which travels into the node through a line card to be transmitted to the nodal switch 244a (FIG. 2). Accordingly, the entire LSD bus 330a (comprised of 8 conductors) has a capacity of carrying 2,048 time slots from the line cards to the nodal switch 244a.

Similarly, the switch-to-line (SLD) data bus 330b is comprised of eight individual bus conductors $SLD_0$ through $SLD_7$. These conductors carry the time slots of PCM-encoded data from the nodal switch 244a back out to the destination via the line cards. The SLD bus 330b is a primary bus, and it is preferably paired with a secondary (redundant) set of conductors (not shown in FIG. 3).

The mid-plane bus structure also contains a high-level data link control (HDLC) bus 362 over which the CPUs in the various cards communicate with the CPU/Matrix card as well as with one another. A timing and control bus structure 364 is also provided on the midplane.

Figure 4:
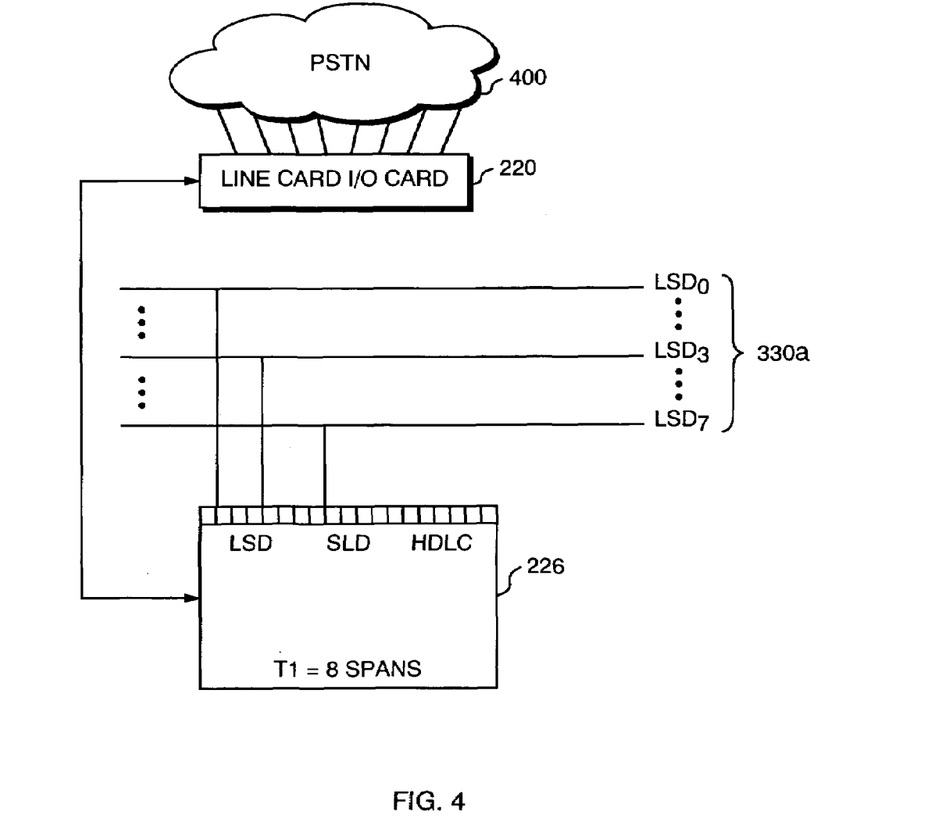
FIG. 4 is a highly schematic illustration of a T-1 line card and its connection to the LSD bus of the preferred telecommunication system.

As mentioned, a T1-line card physically connects to all of the LSD bus conductors. During operation, each T1-line card will be instructed by the nodal switch, or CPU/Matrix card to transmit its PCM encoded data on one of the LDS bus 330a conductors, such as for example $LSD_3$. FIG. 4 is a highly schematic illustration of one T1-line card 226 interfaced with the LSD bus 330a. The line card I/O card 220 provides an interface between PSTN 400 and the T1 line card 226. The T1 line card 226 has a capacity of handling 8 spans or 24 time slots per span of incoming voice information (i.e., PCM-encoded data). Each T1-line card transmits 24 time slots per span or a total of 192 time slots. A T1-line card 226 will be instructed to transmit these 192 time slots using, for example, the LSD bus conductor $LSD_3$. It will also be instructed which time slots during which the transmission should be made.

Figure 5:
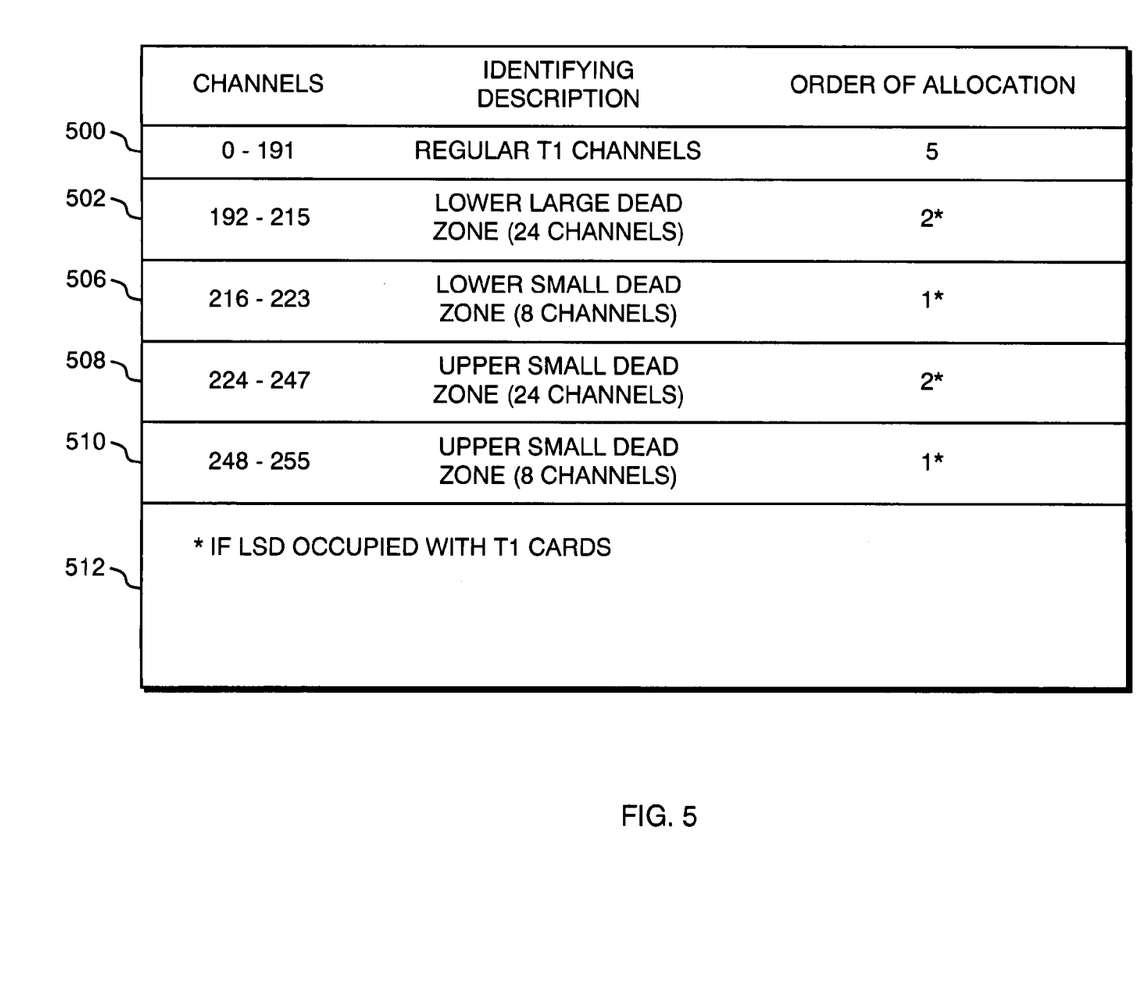
FIG. 5 is a table of the optimal time slot allocation scheme for a typical LSD.

FIG. 5 is a table illustrating the segments of the 256 time slots on the LSD bus 330a. Each segment is given an identifying description. More specifically, when a new T-1 line card is placed into a system in operation, software processes running in the system automatically re-configure the node to support the newly added card. Accordingly, certain time slots are immediately assigned to that T-1 line card so that it can begin to transmit voice information over the internal buses to a nodal switch which are switched out to other ports served by the system.

As shown in line 500 of FIG. 5, channels 0 through 191 are identified as the Regular T-1 channels. This represents the 192 channels, which are needed for each T-1 card for its 8 spans of 24 channels. These channels are communicated on one of the LSD bus conductors. Specifically, they are communicated on channels 0–191 of an LSD bus conductor, such as a conductor LSD0. The remaining channels on that conductor are divided into four separate zones. As shown in line 502, channels 192–215 are known as the Lower Large Dead Zone comprised of 24 channels. As shown in line 506 of the table in FIG. 5 channels 216–223 are known as the Lower Small Dead Zone (8 channels). As shown in line 508, the channels 224–247 are known as the Upper Large Dead Zone (24 channels). Line 510 shows channels 248–255 being identified as the Upper Small Dead Zone (8 channels).

As noted, for T-1 line cards, time slots 0–191 are used first. If all the LSD bus conductors are occupied with T-1 cards, meaning that the Regular time slots are taken, then an additional card will be placed in the Lower and Upper Large Dead Zones indicated in lines 502 and 508 (time slots 192–215 and 244–247). In an eight span T-1 line card, the Large Dead Zone from 4 LSDs would be used. A sixteen span line card uses the Large Dead Zone from all eight LSD bus conductors. A sixteen span card only uses the dead zones, if all other LSD's are full. For example, if there are 8, 8 span T1 cards in the system, and a sixteen span card is inserted, it will then use the dead zones. According to this scheme, the time slots in the small dead zones of the individual bus conductors are still available (i.e., are "left-over") even when the chassis is filled to its capacity with T-1 line cards.

Because a T-1 card will immediately begin to use its assigned time slots, a conference which may have been using those time slots previously could be dropped. Thus, in accordance with the invention, it is preferred to assign those "left-over" time slots which are typically unused by T-1 line cards to conferencing. In this manner, the likelihood that a conferee is dropped is minimized.

More specifically, in accordance with the present invention, the time slot allocation for conferencing is ordered. The order of allocation is shown in the "Order of Allocation" column of FIG. 5. Specifically, the Small Dead Zone time slots from LSDs occupied by T-1 cards are used. These time slots are numbered time slots 216–223 (506) and 248–255 (510) in the preferred embodiment. Even if a new T-1 card is plugged in to an active system, because of the order of allocation of time slots for the new T-1 card it is unlikely that these time slots will be used. More particularly, when a new T-1 card is plugged in and all LSD bus conductors are occupied, the new T-1 card will use time slots in the large dead zones. Thus, the small dead zones are still unused and available for a conference. Thus, if a conference is in progress and using small dead zone time slots, that conference will not be interrupted when an additional T-1 line card is added into the chassis.

The next step in the order of allocation is the Lower and Upper Large Dead Zones [time slots 192–215 (402) and time slots 224–247 (408)]. The Large Dead Zones are only used if all eight T-1 line cards are already inserted and using the eight LSD bus conductors, and a ninth T-1 card is utilized. The next block of time slots in the order of allocation of FIG. 5 is small dead zone time slots from an unoccupied LSD. Once again, these time slots are less likely to be used because even if all LSDs are utilized by a full complement of T-1 line cards, those T-1 cards, are initially assigned to the regular T-1 channels and then, to the large dead zones, leaving the small dead zone time slots still available. The fourth time slot allocation is the large dead zone time slots from an unoccupied LSD. Finally, the "regular" time slots (channels 0–191) from the same LSD are employed. The above describing Order of Allocation minimizes the risk that the addition of a T-1 line card may purge conferees in a conference in progress.

The time slot/bandwidth allocation might also be employed when other cards are being inserted. Thus, a SS7 signaling card which may only use four time slots per card could be assigned time slots in the same order of allocation as just discussed. The voice over IP (VoIP) card uses about 160 time slots per card. Once again, the order of allocation discussed with respect to FIG. 5 could also be employed when using a voice over IP card. Both of those cards have full switching matrixes so that they can drive or receive from any time slot.

With this time slot/bandwidth allocation, the above mentioned cards as well as conferencing make maximum use of the available bandwidth while minimizing the risk that a conferee will be purged when a new line card is inserted.

Figure 6:
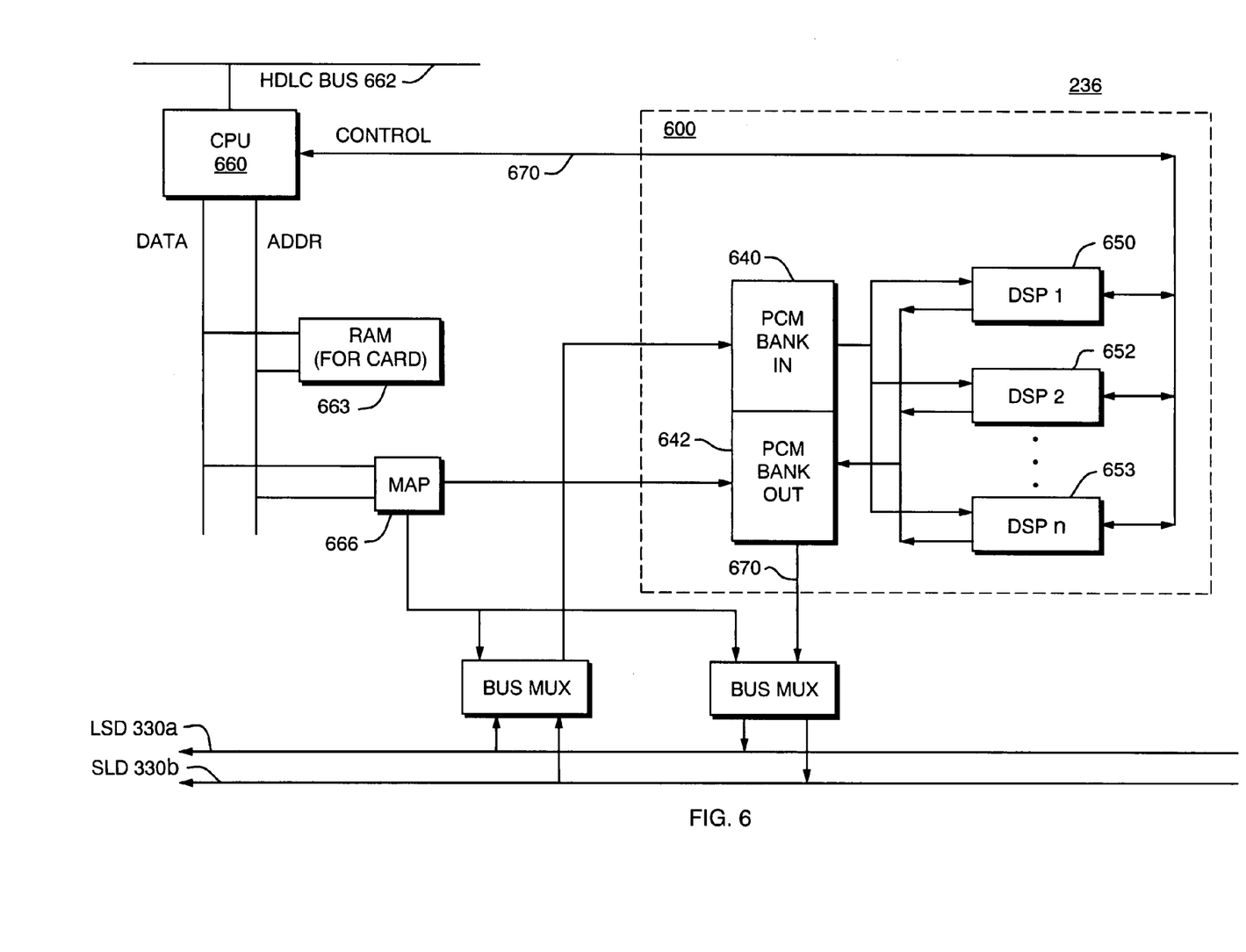
FIG. 6 is a highly schematic block diagram of a DSP card containing a DSP module that may be used in the programmable switching node of FIG. 2.

As discussed previously, the second aspect of allocation of conferencing resources relates to the DSP resources to be used to perform the conferencing algorithm. This aspect of the invention may be better understood with reference to FIG. 6. As stated herein, the conferencing services of the present invention are preferably primarily performed in DSP card 236. FIG. 6 shows one embodiment of a DSP card 236 (FIG. 2) which may be used in accordance with the method and apparatus of the present invention.

The DSP card 236 contains DSP module 600. The DSP module 600 has access to all of the time slots of PCM data coming into the system from the line cards/IO cards 220 (FIG. 2). The PCM data flows from a line card to the nodal switch, and to the DSP card 236 on the LSData, (LSD) bus 330a. It travels to a PCM memory area on the card schematically shown in FIG. 6 as "PCM BANK IN" 640. The outgoing PCM data travels out of the "PCM BANK OUT" section 642 on the card onto the SLData (SLD) bus 330b, back out to the nodal switch, or over the inter-nodal network to another node served by the system.

The DSP module 600 contains multiple DSP chips such as those illustrated as DSP chips 650, 652, 653 in FIG. 6. The DSP chips 650, 652 and 653 communicate over an internal bus 670. Each DSP chip, such as chip 650, can provide many telecommunications services. In addition, the DSP circuitry is capable of conferencing voice information for conferences established in the system 100.

The overall operation of the DSP card 236 is controlled by its CPU 660. The CPU 660 communicates with the CPUs in other components in the node as well as with the CPU/Matrix Card 246 via a high-level data link (HDLC) control bus 662. The CPU 660 receives messages containing instructions about conferences to be established, and it then retrieves the voice information representing each conferee from the appropriate PCM time slots in PCM BANK IN 640 and routes this voice information to one of the DSP chips, such as the chip 650. The chip 650 performs a conferencing algorithm and operates on the voice information to produce conferenced outputs. Those outputs are packetized and placed on internal bus 670 and travel to the SLD bus 330b and ultimately to intended destinations via the appropriate time slot.

Figure 7:
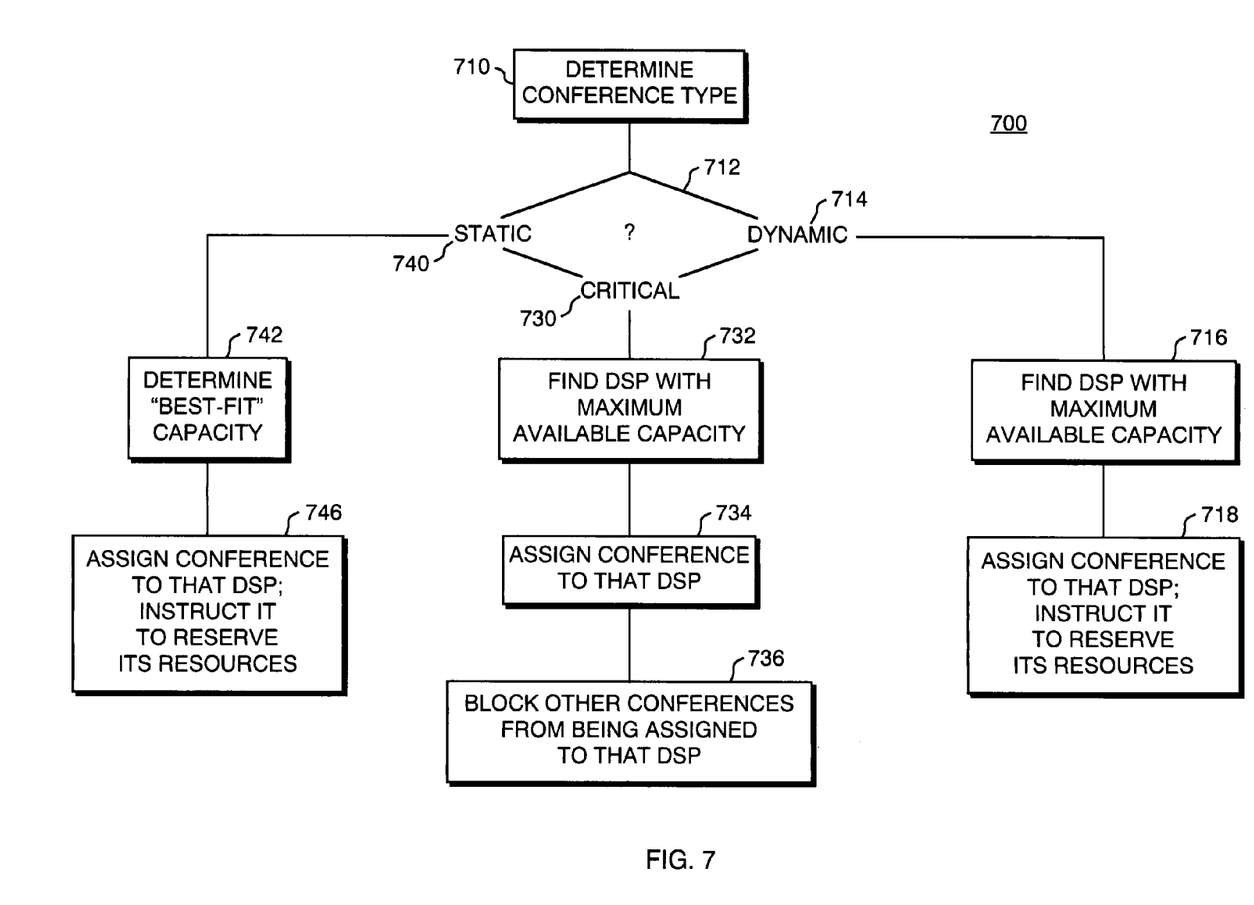
FIG. 7 is a flow chart of the steps to be followed in accordance with the method of the present invention.

FIG. 7 is a flow chart illustrating the method of allocation of DSP resources of the present invention. As noted herein, the DSP card in a node will have multiple DSP chips on board. It is preferred to select a DSP chip for a conference which makes the most efficient use of the system conferencing resource capacity as well as accommodates conferences that are likely to change.

To create a conference, the host issues a request to that effect to a CPU/Matrix card. Then, a software process running on the CPU/Matrix card establishes the conference by locating conferencing resources. To do so, the system of the present invention first identifies the conference type (step 710). This information is available to the CPU/Matrix card either based on user input to the host, or based on the class of service to be provided to the conferees, or based on statistical data which has been prepared by the system that indicates the likelihood that a conference falls into a particular category.

One of the three categories indicated in step 712 is the dynamic conference 714. A dynamic conference 714 is a conference that has already been identified as one which is likely to grow or shrink. For a dynamic conference, it is preferred to select a DSP circuit having as many channels as possible so that a conference can grow as large as possible and that channels remain available for participants who may join the conference dynamically. Thus, in accordance with flow chart 700, the step 716 indicates that the system should find the DSP with the maximum available capacity. Once this is found (step 718), the conference is assigned to that DSP circuit. The selected DSP circuit is instructed to reserve those conference resources and to begin to establish the conference. In the case of the dynamic conference, if the conference is reduced in size, as participants drop out, channels on the DSP become available and another conference may later be added to that DSP.

A critical conference is treated somewhat differently. A critical conference (730) is a dynamic conference that must be given the best opportunity for growth within the system. Similar to the case of a dynamic conference, the decision to treat a conference as a critical conference is either based on user input, or based on the class of service to be provided to the conferees, or based on statistical data which has been prepared by the system that indicates the likelihood that a conference falls into a particular category. For example, the statistical data could be prepared from historical information about the average conference generally handed by the system or handled at a particular port in the system. In this instance one can predict whether the conference is likely to grow or not. In this situation the DSP with the maximum available capacity is located (step 732). Once this is found (step 734), the conference is assigned to that DSP circuit. The selected DSP circuit is instructed to reserve those conference resources and to begin to establish the conference. Further as illustrated in step 736, the system blocks all other conferences from being assigned to that DSP so that capacity remains available for that conference and only that conference for the life of that conference. After the critical conference is finished and has been removed from the DSP, then other conferences are no longer blocked from being established on that DSP.

The static conference as indicated by reference numeral 740 is handled on "best fit" basis (742). All conferences that are occurring in the system are evaluated and the static conference is assigned to the DSP with a best fit capacity. A static conference is one in which the system has information that the conference is going to remain a certain size, such as three or twenty, participants. Thus, a DSP with sufficient resources but which may have only those resources available is assigned to the static conference. Indeed, a static conference may be unlikely to be assigned to a DSP that currently handles a dynamic conference. It would not be assigned to a DSP providing a critical conference. As shown in step 746, the static conference is assigned to the DSP, and the DSP is instructed to reserve those resources.

In accordance with the above allocation of DSP resources scheme, this system can accommodate conferences having various sizes and which can change dynamically. In addition, user-definable parameters may also be employed to determine the conference type.

The present invention thus provides a method and apparatus for dynamic allocation of conferencing resources for large conferences. The system supports conferences which can change in size while the conference is in progress. The method and apparatus is compatible with a high speed, expandable telecommunication system having a system configuration that may change while the system is in operation.

While the invention has been particularly shown and described with reference to preferred embodiments thereof, it will be understood by those skilled in the art that various changes in form and details may be made therein without departing from the spirit and scope of the invention. Furthermore, the terms of expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A method of providing conferencing resources in an expandable telecommunications system having a plurality of nodes, and a host coupled to at least one node of the plurality of nodes for controlling the system in which conferencing resources are utilized by one or more of said plurality of nodes that are participating in a conference, the method including the steps of:

(A) providing the plurality of nodes with means for connecting and disconnecting communications paths between a plurality of ports having digital network/line interfaces that couple the plurality of nodes with a PSTN and private network, said plurality of nodes including switching nodes that can switch communications to any port connected to the system, and at least two of said switching nodes being conferencing nodes, said conferencing nodes including individual digital signal processing (DSP) circuits programmed to perform a conference between three or more participants who are callers connected at any port in the system, and said switching nodes having switching buses on which each node of said plurality of nodes is assigned time slots for transmitting and receiving data and control information and said switching nodes being connected in communicating relationship by an inter-nodal network;

(B) defining a requested conference as being of one of a dynamic conference type, a critical conference type and a static conference type, including determining conference type by employing statistical analysis and/or historical data about past system conference behavior in said statistical analysis to predict conference type;

(C) identifying a DSP circuit within a conferencing node that has available resources for performing a conferencing function for a conference of that type as requested in the system; and (D) after said DSP circuit within a conferencing node that has available resources has been identified, determining whether the conferencing node in which said identified DSP circuit is located has sufficient available time slots on its switching bus to manage the data to and from all of the participants in the requested conference.

2. The method of providing conferencing resources as defined in claim 1, including the further step of employing user-defined parameters to determine conference type.

3. The method of providing conferencing resources as defined in claim 1, including the further step of using historical information about an average conference generally handled by a particular system and handled at a particular port to predict conference type.

4. The method of providing conferencing services as defined in claim 1, including the further step of defining as said dynamic conference a conference that is likely to change in size based upon predetermined criteria.

5. The method of providing conferencing services as defined in claim 4, including the further step of assigning a DSP circuit within a conferencing node having the maximum available capacity for a conference which has been identified as a dynamic conference.

6. The method of providing conferencing services as defined in claim 5, including the further step of selecting for a dynamic conference a DSP circuit within a conferencing node in the system having as many channels as possible such that a conference can grow as large as possible and that channels remain available for participants who join the conference while in progress.

7. The method of providing conferencing services as defined in claim 1 including the further step of defining as said critical conference a conference that requires the maximum opportunity for growth in the system.

8. The method of providing conferencing services as defined in claim 7 including the further step of selecting, for establishing a critical conference, a DSP circuit within a conferencing node with the maximum available capacity and instructing said DSP circuit with said maximum available capacity to reserve these conference resources and to establish the critical conference, and further instructing the said DSP circuit to block other conferences from being assigned to that DSP circuit such that capacity remains available for that critical conference, for the life of that critical conference.

9. The method of providing conferencing services as defined in claim 8 including the further step of revealing blocked channels for use by the DSP circuit within the conferencing node with the maximum available capacity, after the critical conference is finished.

10. The method of providing conferencing services as defined in claim 1, including the further step of defining as said static conference a conference in which the number of participants will remain substantially constant.

11. The method of providing conferencing services as defined in claim 10, including the further step of assigning a static conference to a DSP circuit within a conferencing node on a "best fit" basis.

12. A method of providing conferencing resources in an expandable telecommunications system having a plurality of nodes, and a host coupled to at least one node of a plurality of nodes for controlling the system in which conferencing resources are utilized by one or more nodes of said plurality of nodes that are participating in a conference, the method including the steps of:

(A) providing said telecommunications system with a line-to-switch (LSD) data bus comprised of multiple individual bus conductors, each bus conductor carrying time slots coming into a node of said plurality of nodes from line cards, including T1 line cards, and said system further including a switch-to-line (SLD) data bus comprised of multiple individual bus conductors that carry time slots of PCM-encoded data from a nodal switch in the node back out to a destination line card;

(B) defining a requested conference as being of one of a dynamic conference type, a critical conference type and a static conference type;

(C) identifying a DSP circuit within a conferencing node that has available resources for performing a conferencing function for a conference of the type requested; and (D) identifying a zone of time slots having the lowest order of allocation such that it is least likely to be taken when a new T1 card is inserted into the system during operation, and assigning a conferencing node to use these lowest orders of allocation time slots for a requested conference.

13. The method of providing conferencing resources as defined in claim 12, including the step of:

(a) allocating zones of time slots in such a manner that 192 time slots of a T1 span are divided into the following segments:

time slots 0–191 are in the regular T1 channel;

time slots 192–215 are the lower dead zone;

time slots 216–223 are in the lower small dead zone;

time slots 224–247 are in the upper large dead zone; and time slots 248–255 are in the upper small dead zone; and (b) assigning time slots in the lower and upper small dead zones of the individual bus conductors to conferences.

14. An expandable telecommunications system having means for conferencing three or more participants interfaced with the system, the system comprising:

(A) a plurality of nodes for performing telecommunications switching, each node of said plurality of nodes including means for dynamically connecting or disconnecting communication paths with respect to various ones of a plurality of ports, means for time switching information to or from said plurality of ports, means for coupling each node of the plurality of nodes with a PSTN and private networks via digital network/line interfaces, said plurality of nodes including switching nodes that can switch communications to any port connected to the system via said PSTN and private networks, and means for transmitting and receiving information in packetized form, and means connected in communicating relationships including a bus for carrying data to and from said ports;

(B) a host connected in communicating relationship with at least one of said switching nodes, said host controlling predetermined operations of the system;

(C) means in said switching nodes for generating and sending a message requesting establishment of a conference call for at least three conferees connected to one or more of said plurality of nodes;

(D) means for interconnecting said switching nodes in communicating relationships and operable in conjunction with said transmitting and receiving means to transfer said packetized information such that information which originates from any port in the switching nodes is substantially continuously communicable to any node interfaced with said interconnecting means;

(E) at least one conferencing node for providing conferencing services, said at least one conferencing node interfaced with said interconnecting means and including individual DSP circuits, said conferencing node also having means for switching communications, including conferenced output to any other port interfaced with the system from the PSTN and private networks; and (F) means for allocating conferencing resources including:

1. means for determining whether a DSP circuit in a conferencing node has available conferencing resources to perform a requested conference; and
2. means for determining whether a conferencing node has sufficient available time slots on its switching buses to manage the data to and from the conferences or a particular requested conference (G) a DSP card in said conferencing node, including:
1. a DSP module which contains a plurality of DSP circuits; and
2. a CPU including means for receiving messages about conferences to be established, and means for routing voice information to a DSP chip identified for a particular conference; and (H) line-to-switch (LSD) data bus interfaced with line cards which connect ports in the system, and which carries a PCM-encoded voice information from the line cards to said DSP cards.

15. The expandable telecommunications system as defined in claim 14 wherein said voice information for paid conference arrives at a port coupled with one or more of the following:

a. a landline telephone;
b. the PSTN;
c. a private network;
d. a wireless network; and
e. the Internet.

* * * * *